(12) United States Patent
Maher et al.

(10) Patent No.: US 6,251,816 B1
(45) Date of Patent: Jun. 26, 2001

(54) CAPACITOR AND DIELECTRIC CERAMIC POWDER BASED UPON A BARIUM BORATE AND ZINC SILICATE DUAL-COMPONENT SINTERING FLUX

(75) Inventors: Galeb H. Maher; Samir G. Maher, both of Williamstown, MA (US)

(73) Assignee: MRA Laboratories, Inc., North Adams, MA (US)

( * ) Notice: Subject to any disclaimer, the term of this patent is extended or adjusted under 35 U.S.C. 154(b) by 0 days.

(21) Appl. No.: 09/224,536

(22) Filed: Dec. 31, 1998

(51) Int. Cl.[7] .................. C04B 35/468; C04B 35/488; C04B 35/49; H01G 4/10
(52) U.S. Cl. .................. 501/138; 501/139; 361/321.5
(58) Field of Search ................... 501/138, 139; 361/321.5

(56) References Cited

U.S. PATENT DOCUMENTS

| | | | |
|---|---|---|---|
| 3,988,498 | * 10/1976 | Maher | 428/434 |
| 4,533,974 | 8/1985 | Maher | 361/320 |
| 4,897,249 | * 1/1990 | Ross et al. | 423/280 |
| 4,898,844 | * 2/1990 | Maher et al. | 501/138 |
| 5,264,403 | 11/1993 | Abe et al. | 501/139 |
| 5,599,757 | 2/1997 | Wilson et al. | 501/137 |

OTHER PUBLICATIONS

Malcom McQuarrie et al; pp. 539–543, Journal of American Ceramic Society, vol. 37, No. 11, (Nov. 1954).

\* cited by examiner

*Primary Examiner*—David Brunsman (57) ABSTRACT

Temperature compensating capacitors and dielectric ceramic powder compositions therefor are disclosed, based upon a dual-component barium borate and zinc silicate sintering flux. The precursor dielectric ceramic powders can include $(1-m)\ BaTiO_3+(m)\ CaZrO_3$ (BTCZ composition), with m ranging from 20 mole percent to 35 mole percent, $xBaO.yTiO_2.zRE_2O_3$ (rare earth composition), (RE being a rare earth metal), with x ranging from 0 m % to 30 m %, y ranging from 45 m % to 95 m %, and z ranging from 5 m % to 50 m %, or a combination of the BTCZ and rare earth composition in varying weight percents. The effective range of $B_2O_3$ in the barium borate ranges from 0.029 w % to 2.75 w % of the total dielectric composition, whereas the effective range of $SiO_2$ in the zinc silicate ranges from 0.08 w % to 1.42 w % of the total dielectric composition.

18 Claims, 8 Drawing Sheets

CAPACITOR AND DIELECTRIC CERAMIC POWDER BASED UPON A BARIUM BORATE AND ZINC SILICATE DUAL-COMPONENT SINTERING FLUX

FIELD OF THE INVENTION

The present invention relates to temperature compensating capacitors, and dielectric compositions therefor, based upon a dual-component sintering flux of barium borate and zinc silicate to yield high quality factors and densities when sintered below 1,155° C.

BACKGROUND OF THE INVENTION

Figure 1:
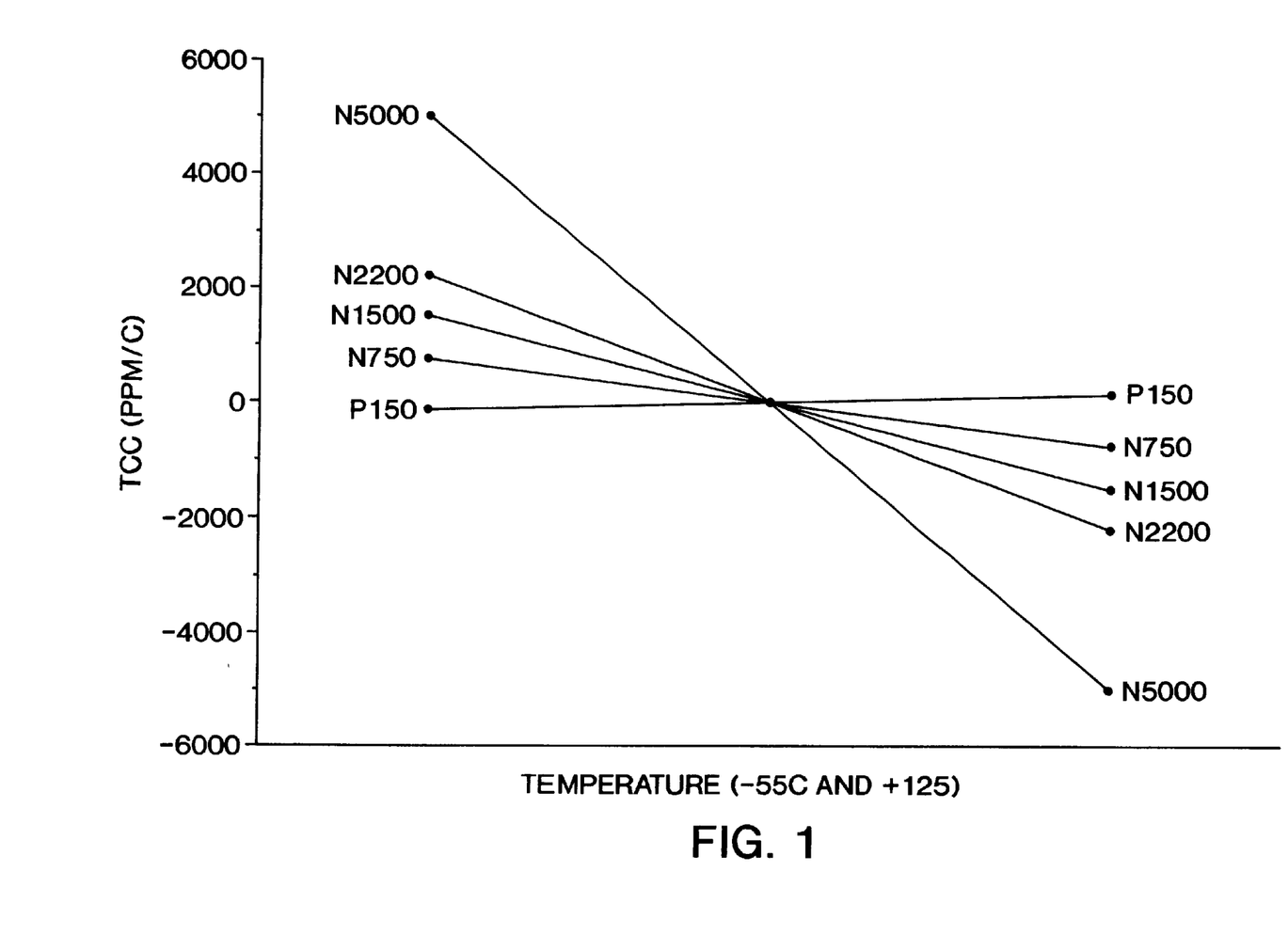
FIG. 1 is a two-dimensional graph demonstrating the linear relationship of TCC and temperature over the range of −55° C. and +125° C. of common linear dielectrics. It is noted that N type dielectrics have negative capacitance slopes and P type dielectrics have positive capacitance slopes. The NPO (COG) type dielectric has a zero or near zero slope.

Temperature compensating (TC) capacitors exhibit a linear change in the temperature coefficient of capacitance (TCC) over the temperature range of −55° C. and +125° C. The different dielectrics employed have linear TCC slopes that vary between a negative slope of about 5,000 PPM/° C. (parts per million/° C.) to a positive slope of about 150 PPM/° C., as plotted in FIG. 1. The most common dielectrics are the N4700, N3300, N2200, N1500, N750, N330, NPO (COG), P90, and P150. EIA-98 standard (Electronics Industries Association).

Per the EIA-98 standard, TC capacitors must have a quality factor Q of at least 1,000 (a percent dissipation factor % DF of 0.1). Q is the reciprocal of DF, or Q=1/DF or Q=1/(% DF X 0.01). To attain high Q values, though, the TC capacitor's microstructure density must exceed 95% of the theoretical value. In general, to attain a high density, an unfired TC capacitor would require firing at a temperature of at least 1,250° C. But, such a high sintering temperature can adversely affect the fired TC capacitor:

a) Capacitors commonly use electrodes of 70% Ag/30% Pd alloy. This alloy has a solidus temperature at approximately 1,155° C. and could therefore not be used if the sintering temperature is higher than 1,155° C. This is problematic because in pure form, titanates or modified titanates, such as the alkaline earth metal titanates (pure or modified) or mixtures with zirconates or rare earth metal oxides, need sintering higher than 1,155° C. to attain densities exceeding 95% of theoretical.

b) In deriving TC capacitors, it is common to mix dielectric materials to achieve certain electrical and linear properties, such as a particular dielectric constant K or a TCC. For example, when positive TCC and negative TCC materials are mixed, a modified or shifted TCC results, such as mixing $CaTiO_3$ (−TCC, N750) and $MgTiO_3$ (+TCC, P110). Certain titanates or modified titanates, though, when mixed, can yield solid solutions rather than a multiple phase if sintered at 1,250° C. or higher.

Prior art discloses certain glass modifiers and formers that lower sintering temperature to below 1,250° C. For the most part, though, these modifiers/formers are based on heavy metal oxides, such as $Bi_2O_3$, PbO, and CdO. While heavy metal oxides are useful to reduce sintering to below 1,155° C., they are volatile and tend to reduce a dielectric's Q. Further, PbO and CdO are environmental hazards and the industry's trend has been to avoid them. And, $Bi_2O_3$ can be reactive with Ag/Pd electrodes.

In U.S. Pat. No. 3,988,498, Maher, the present inventor disclosed a linear dielectric material of $BaO.RE_2O_3.TiO_2$ (RE is a rare earth metal). A glass of borate and silicate with a modifier $Al_2O_3$ and a heavy metal oxide of PbO or $Bi_2O_3$ were used to lower sintering temperature. CdO and ZnO were employed to adjust the TCC and glass melting temperature. This system, though, relied on heavy metal oxides.

In U.S. Pat. No. 4,533,974, Maher, the present inventor disclosed a $Mg_xZn_yTiO_3$ and $CaTiO_3$ dielectric material. This system used a metal oxide flux of $MgO.B_2O_3$, $MgO.ZnO.B_2O_3$, or $CdO.ZnO.B_2O_3$ flux to lower sintering to below 1,155° C. The flux was borate dependent. The '974 also teaches that silicate and barium borate do not yield satisfactory results.

In U.S. Pat. No. 5,264,403, Abe et al. disclosed a system of $BaO.RE_2O_3.TiO_2.Bi_2O_3$ and a glass of $ZnO-B_2O_3-SiO_2$. The flux depends on the heavy metal oxide $Bi_2O_3$ since, in the form in which it is added, the $Bi_2O_3$ will act as a modifier. Further, the '403 treats metal oxides, such as BaO, as contaminants.

In contrast to the prior art, the present invention discloses a dual-component sintering flux based on zinc silicate and barium borate. This disclosed flux allows sintering of TC capacitors derived of positive and negative TCC dielectric materials at temperatures less than 1,155° C. The fired densities are very high (often in excess of 95% of the theoretical value) and achieve the EIA-198 standard of % DF=0.1. Importantly, dielectric ceramic compositions based on the disclosed flux do not depend on glass modifiers of heavy metal oxides, such as $Bi_2O3$, PbO, or CdO.

Consequently, it is an objective of the present invention to provide TC capacitors and dielectric ceramic powders that have no glass modifers of heavy metal oxides, such as PbO, CdO, and $Bi_2O_3$.

It is a further objective of the present invention to provide TC capacitors and dielectric ceramic powders that exhibit a high Q (or in excess of 5,000) and a very high density (or in excess of 95% of the theoretical value), where the unfired capacitor and dielectric compositions therefor can be sintered at less than 1,155° C.

It is a further objective of the present invention to provide derivable dielectric ceramic powders that can exhibit formulated linear and electrical properties.

It is a further objective of the present invention to provide a dual-component sintering flux of barium borate and zinc silicate to enable sintering different dielectric ceramic powders and formulations at lower temperatures (less 1,155° C.) yet provide a high Q (in excess of 5,000) and a high density (in excess of 95% of the theoretical value).

These and still further objectives will become apparent hereinafter.

SUMMARY OF THE INVENTION

The present invention discloses TC capacitors and dielectric ceramic powders based on a sintering flux of zinc silicate and barium borate for derivable linear properties. The dielectric ceramic powders and TC capacitors can be fired at temperatures less than 1,155° C., yet still achieve high densities and high Q factors. With the lower sintering temperatures, mixtures of dielectric ceramic powders can be used to derive linear and electrical properties without the adverse effect of solid solutions. Moreover, the inexpensive 70% Ag/30% Pd electrodes can be used in the TC capacitors.

The dielectric ceramic powders comprise barium titanate with partial substitution by calcium zirconate (for large negative TCC slopes and K values greater than 450), or a rare earth metal oxide, such as neodymium oxide, partially substituting for barium oxide (for COG and K=~65), a magnesium zinc titanate or $(Mg_xZn_yBa_zCa_w)TiO_3$ (for COG and K=~25), a magnesium titanate (for positive TCC slopes~100 and K=~15), or mixtures thereof for adjusted slopes and K values. These powders (and mixtures thereof) allow modified or adjusted TCC slopes. Through additives, such as strontium titanate, barium zirconate, or bismuth titanate, the TCC slope can be further modified, depending on the amount and type of additive included. The functional range of partial substitution of calcium zirconate for barium titanate ranges from 20 m % (mole percent) to 35 m %. With substitution of barium oxide by a rare earth metal oxide, the functional molar composition is $xBaO.yTiO_2.zRE_2O_3$, with x ranging from 0 m % to 30 m %, y ranging from 45 m % to 95 m %, and z ranging from 5 m % to 50 m %.

A dielectric ceramic powder for sintering or making a capacitor comprises from 91 weight percent to 99 weight percent of a dielectric ceramic composition, and from 1 weight percent to 9 weight percent of the dual-component flux (zinc silicate contributing from 0.5 weight percent to 4 weight percent, barium borate contributing from 0.5 weight percent to 5 weight percent). One or more additives can also be included to adjust the TCC slope. While zinc silicate has only one phase $2ZnO.SiO_2$, barium borate may exist in four phases, $BaO.B_2O_3$, $3BaO.1B_2O_3$, $BaO.2B_2O_3$, and $BaO.4B_2O_3$. The $BaO.B_2O_3$ the $3BaO.B_2O_3$ phases are the preferred phases. The contribution of $B_2O_3$ and $SiO_2$ should be taken into account, wherein the functional weight percent of $B_2O_3$ in the barium borate should range from 0.029 w % to 2.75 w % of the total weight of the dielectric composition, whereas the functional weight percent of $SiO_2$ in the zinc silicate should range from 0.08 w % to 1.42 w % of the total weight of the dielectric powder.

The flux can be employed as a zinc-borasilicate glass or as separate components of zinc silicate and barium borate. In either embodiment, the precursor-flux composition can still be sintered at temperatures less than 1,155° C. with acceptable results. The sintering flux is also effective when added to a calcine of a dielectric ceramic composition (i.e. $BaTiO_3$-$CaZrO_3$ or $xBaO.yTiO_2.zRe_2O_3$), whether as a glass or as zinc silicate and barium borate components. In fact, the sintering flux is effective when the dielectric ceramic powder is the calcine of a dielectric ceramic composition (i.e. $BaTiO_3$-$CaZrO_3$ or $xBaO.yTiO_2.zRE_2O_3$) mildly calcined with the flux composition.

Figure 6:
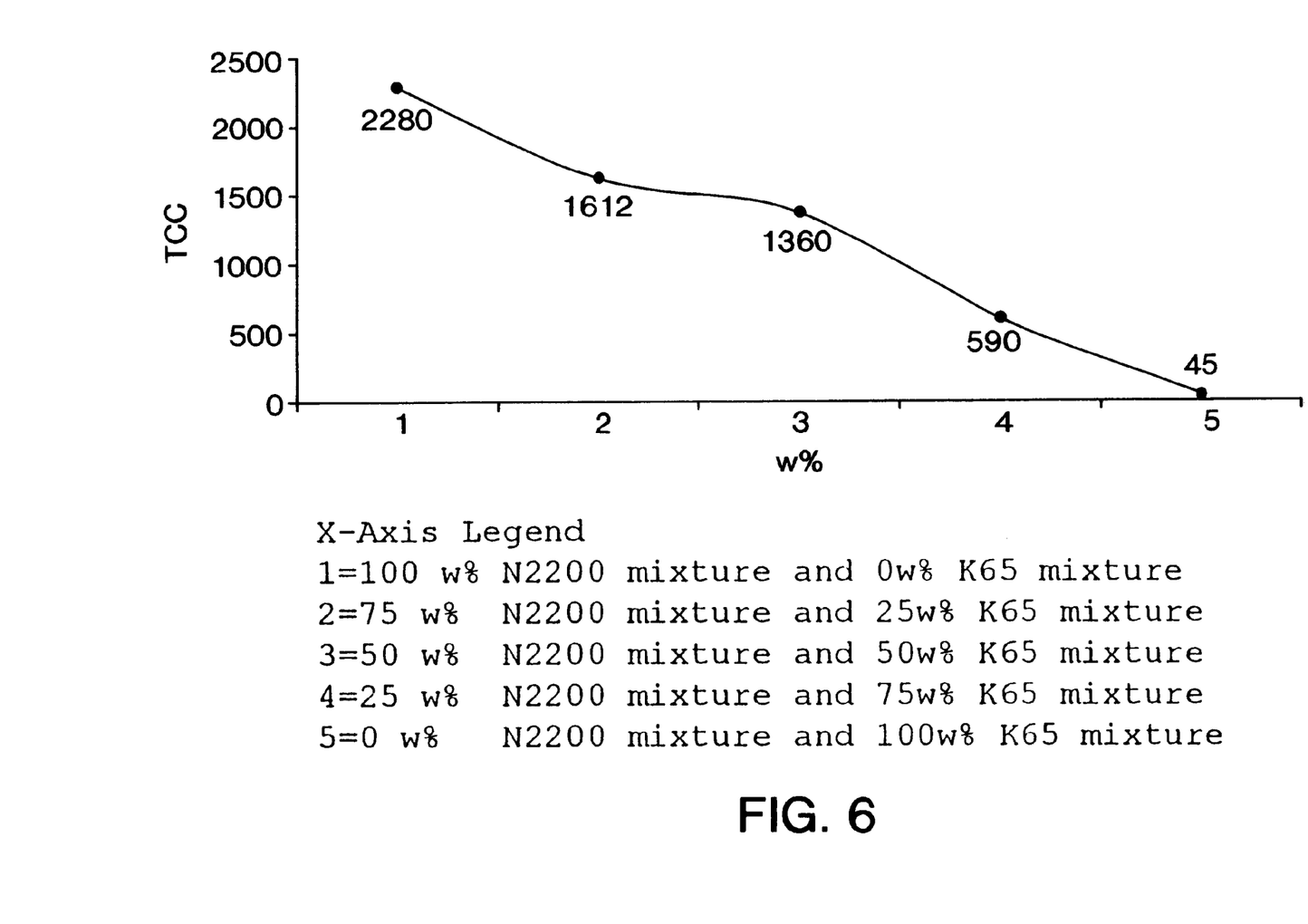
FIG. 6 is a plot of a calcine of an N2200 dielectric ceramic powder and a calcine of a K65 dielectric ceramic powder mixed together in varying weight percentages relative to the TCC. This particular curve provides the weight percentages of the calcines needed to obtain a specific TCC slope.

The calcine of a first powder mixture of $BaTiO_3$-$CaZrO_3$, additive and flux, and the calcine of a second powder mixture of $xBaO.yTiO_2.zRE_2O_3$, additive and flux, can be mixed in different amounts to derive TC capacitors and dielectrics of specific linear and electrical properties, depending on the mix and properties of the composition of the individual powder mixture calcine. When mixed in this manner and the weight percentages of each of the first and second powder mixtures is plotted relative to a particular linear or electrical property, the resulting curve provides the weight percentages of each of the first and second powder mixtures needed to derive a dielectric or TC capacitor exhibiting the desired property. An example is shown in FIG. 6, where a first powder mixture derived to exhibit a TCC of N2200 and a K of 450 and a second powder derived to exhibit a TCC of NPO and a K of 65 were mixed in varying weight percentages and plotted relative to the TCC slope.

BRIEF DESCRIPTION OF THE DRAWINGS

FIG. 2 is a cross sectional view of a capacitor having one layer. The capacitor comprises a ceramic body 10, one electrode 11 composed of an alloy of 70% silver and 30% palladium buried within body 10, an external conductive terminal 12 by which external contact is made to electrode 11, and a second electrode 13 in contact with body 10 and in capacitive relationship with electrode 11.

DESCRIPTION OF THE INVENTION AND EXAMPLES

A. Titanate/Zirconate Examples:

This set of examples demonstrates barium titanate with partial substitution by calcium zirconate, with the objective to attain an N2200 dielectric exhibiting a very high Q and a K in the 450 range. The barium titanate-calcium zirconate system has been previously studied. McQuarrie and Behnke, Structural and Dielectric Studies in the System (Ba,Ca)(Ti, Zr)$O_3$, Journal of the American Ceramic Society, Vol.37, No.11, November, 1954. When $(1-m)BaTiO_3+(m)CaZrO_3$ compositions are mixed, in excess of the solubility of calcium zirconate in barium titanate, and calcined over 1,100° C., a limited solid solution occurs. The new phase can be in the form of $(Ba_{1-m}Ca_m)(Ti_{1-z}Zr_z)O_3$. The substitution of Ca for Ba, and Zr for Ti, in the pervoskite crystal lattice, will cause a shift in the ferro-electric to para-electric transition temperature of $BaTiO_3$ from +125° C. to well below −100° C. This composition will exhibit a negative TCC slope. The titanate/zirconate TCC slope can be modified by varying the mole percent of calcium zirconate substituted for barium titanate. The TCC slope is further adjusted by adding bismuth titanate to adjust the linearity to an N2200±150 PPM/° C. Modifying the TCC slope may also be undertaken with strontium titanate, previously studied by R. J. Cava et al., Compensation of the temperature coefficient of the dielectric constant of barium strontium titanate, Appl. Phys. Lett. 67(25), Dec. 18, 1995.

Two compositions of sample discs of barium titanate and calcium zirconate were prepared. The mixture was stoichiometric as $(1-m)BaTiO_3$ and $(m)CaZrO_3$, where the two resulting mixtures were $(Ba_{0.75}Ca_{0.25}Ti_{0.75}Zr_{0.25})O_3$ and $(Ba_{0.70}Ca_{0.30}Ti_{0.70}Zr_{0.30})O_3$. Powders of $BaCO_3$, $CaCO_3$, $TiO_2$, and Z in proportions to derive the composition of $(1-m)BaTiO_3$ and $(m)CaZrO_3$ (m being either 30 m % or 25 m %) were milled with de-ionizer water for several hours, dried, granulated, and calcined at about 1,150° C., to yield a high temperature phase powder. The powder was milled or pulverized to achieve an average particle size of less than 2 microns. Barium borate powder and zinc silicate powder were then added in different weight percentages, as shown in the examples.

Monolayered sample discs were prepared from 50 gm batches. The batches were combined with certain additives, as shown in the examples, a small amount of an organic binder, solvent and dispersant, milled for about 15 hours and dried. This process produced homogeneous mixtures, which were granulated and compressed into discs at about 15,000 PSI, and subsequently fired at 1,130° C. The fired dimensions of the discs were about 1 cm in diameter and about 0.8 mm in thickness.

The effect of the dual-component flux is realized via the 75/25 dielectric ceramic powder mixture. Referring to Table 1, when this mixture was sintered at 1,300° C., without any flux or component thereof, as shown by sample 1, the fired disc was openly porous, and electrical and linear properties could not be measured. Adding 2 w % $Zn_2SiO_4$ and sintering at 1,250° C., as shown by sample 2, the disc attained a density of 5.55 g/cm$^3$ and a % DF of 0.09. The TCC slope was very negative since only 25 m % of barium titanate was substituted by calcium zirconate. Example 3, when sintered at 1,130° C., was openly porous. However, adding 1w % $BaO.B_2O_3$ and sintering at 1,130° C., as shown by sample 4, the disc attained a density of 5.58 g/cm$^3$ and a % DF of 0.068. As shown by samples 5 and 6, increasing the $BaO.B_2O_3$ weight percent decreased the Q factor, though the density remained within acceptable limits.

Referring to the 70/30 mixture, the TCC slope is less negative than the 75/25 (more substitution of calcium zirconate), as shown by samples 7–10. Sample 7 had only the zinc silicate component of the flux (2 w %). Sintering at 1,250° C. was necessary to attain a high density and a Q of 2,000. As shown in sample 8, adding 1 w % $BaO.B_2O_3$ with sintering at only 1,130° C. achieved a Q of 10,000 and a high density of 5.47. Increasing the amount of $BaO.B_2O_3$, as with the 75/25 mixture, showed a decrease in Q, most likely due to the 1:1 increase of BaO and $B_2O_3$, as demonstrated through FIG. 7A, FIG. 7B, and FIG. 7C.

Table 2 shows the results when the zinc silicate amount was varied, using the 75/25 mixture (with 0.1 w % manganese carbonate for improving insulation resistance at high temperatures). For zinc silicate weight percentages of 0.5 through 1.5, samples 11–13 were openly porous when sintered at 1,130° C. At 2.5 w % and 3 w % zinc silicate, samples 14 and 15 yielded measurable properties, densities and Q factors. However, the results were poor, probably due to the zinc silicate approaching the limit of its operable amount, as seen through FIG. 7A, FIG. 7B, and FIG. 7C.

Samples 16–19 show the effect of $3BaO.B_2O_3$, using the 75/25 mixture (with 0.1 w % manganese carbonate for improving the insulation resistance at high temperatures). In light of the 3:1 mole ratio of barium oxide to borate, the weight percent of $3BaO.B_2O_3$ must be greater than that weight percent of $BaO.B_2O_3$ to achieve a higher borate amount. The results bear this out, as shown by samples 16–19. Increasing the $3BaO.B_2O_3$ to 3 w %, as shown by sample 19, yielded a high density and a Q of≈833.

Referring to Table 3, bismuth titanate was added to adjust the TCC linearity and slope to an N2200. Characteristic of $Bi_2Ti_2O_7$ is the positive TCC slope and low dielectric constant, as shown by sample 25.

The 70/30 dielectric ceramic powder mixture was not specifically useful for an N2200 TCC in light of the too positive effect of the 30 m % calcium zirconate and bismuth titanate on the TCC slope, as shown by samples 22–24. However, the 75/25 mixture, when adjusted by only 5 w % of bismuth titanate, yielded an N2200±150 PPM/° C., with a Q of 10,000 and a high density of 5.57 g/cm$^3$, as shown by sample 29. The sintering temperature was only 1,130° C. With 0.1 w % $MnCO_3$, as shown by sample 21, with 4 w % bismuth titanate, an N2200 dielectric was attained, with a Q of≈3,333.

In attempt to adjust the TCC slope of the 70/30 mixture, strontium titanate was used in light of its negatively sloped TCC. With only 2 w % of the zinc silicate component, as shown by samples 32 and 33 of Table 4, it was necessary to sinter at 1,250° C. While the Q factor ranged from 1,250 to 2,000, the TCC slope was by no means linear, indicative of the solid solution of the $SrTiO_3$ when sintered at 1,250° C. Samples 40–45, comprising the 70/30 mixture, confirmed strontium titanate forming the solid solution since these samples demonstrated the increasing nonlinearity of the TCC with greater amounts of strontium titanate.

Adding 1 w % $BaO.B_2O_3$ (with the 2 w % zinc silicate), sintering could be done at 1,130° C.—thereby hindering the formation of the solid solution of $SrTiO_3$. Increasing the $SrTiO_3$ to 20 w %, as shown by sample 37, the TCC slope approached an N2200. While the Q factor was low (Q≈333), the dielectric ceramic powder could be sintered at 1,130° C. Using additives, the TCC slope, possibly, might have been adjustable to an N2200.

The effectiveness of the zinc silicate and barium borate flux as a glass was also examined. The glass was tested using the 75/25 mixture, where a two-to-one weight ratio of zinc silicate to barium borate ($BaO.B_2O_3$ phase) was prepared to make a zincborasilicate powder. This powder was ball milled for 24 hours in isopropyl alcohol to form a slurry, dried at 85° C. to a powder, granulated through a 20 mesh screen. The resulting powder was then calcined at 750° C.

for 1 hour, re-milled in the isopropyl alcohol, dried and granulated. In summary, the glass sample (3 w % zincborasilicate glass), when sintered at 1,130° C., yielded an N2200±150 PPM/° C. dielectric with a density of 5.48 g/cm$^3$, a 436 K, and a 2,500 Q. In comparison, the sample with the flux added as separate components of 2 w % zinc silicate and 1 w % BaO.B$_2$O$_3$ and sintered at 1,130° C., yielded an N2200±150 PPM/° C. dielectric with a density of 5.47g/cm$^3$, a K of 433, and a Q factor exceeding 10,000. Based upon this example, it appears that the flux as separate components is a preferred embodiment for the BaTiO$_3$-CaZrO$_3$ mixture.

Sample multilayered capacitors were prepared using the 75/25 mixture. The method used to prepare the dielectric ceramic composition was the same as that described above, except that the composition was 92 weight percent, the sintering flux was 3 weight percent (2 w % Zn$_2$SiO$_4$, 1 w % BaO.B$_2$O$_3$), and the additive Bi$_2$Ti$_2$O$_7$ powder was 5 w %. The mixture of powders were combined in an organic vehicle and binder medium. The organic vehicle was xylene and N-butanol in a 70/30 weight ratio respectively. The binder medium was a poly-vinyl butyryl. This slurry contained by weight 50% of solvent (the vehicle), 9% of binder, a few percent of organic dispersant and plasticizer, and the dielectric ceramic composition, flux and bismuth titanate. The slurry was milled for about 6 hours to assure the homogeneity of the powders.

Figure 3:
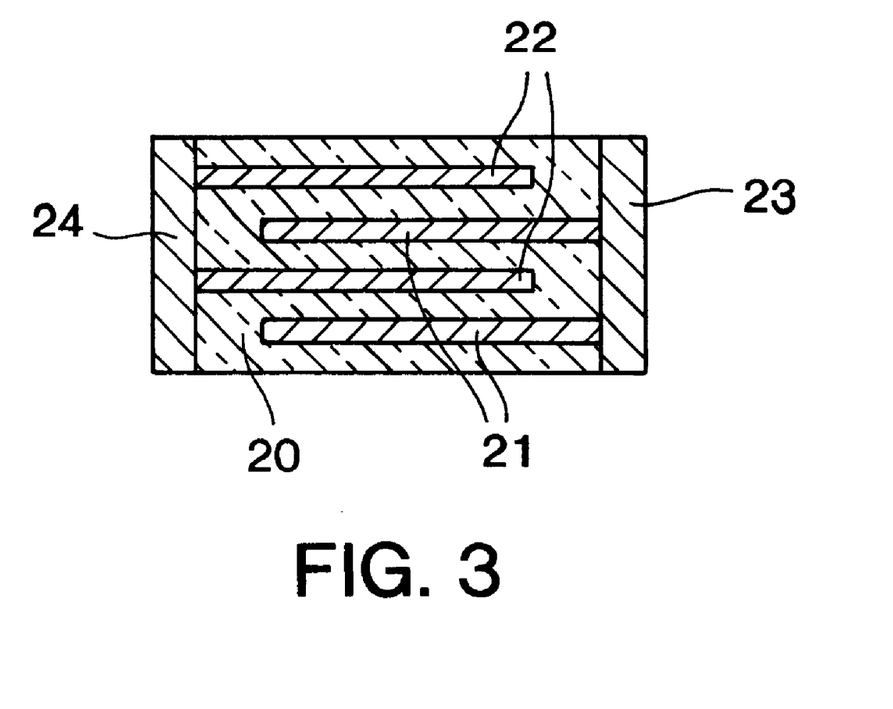
FIG. 3 is a cross sectional view of a multilayered capacitor comprising a ceramic body 20, a group of electrodes 21 buried within body 20 and in capacitive relationship with another group of buried electrodes 22. External terminals 23 and 24 are connected to the group 21 and the group 22 electrodes respectively. Each electrode is composed of an alloy of 70% silver and 30% palladium.
Figure 4:
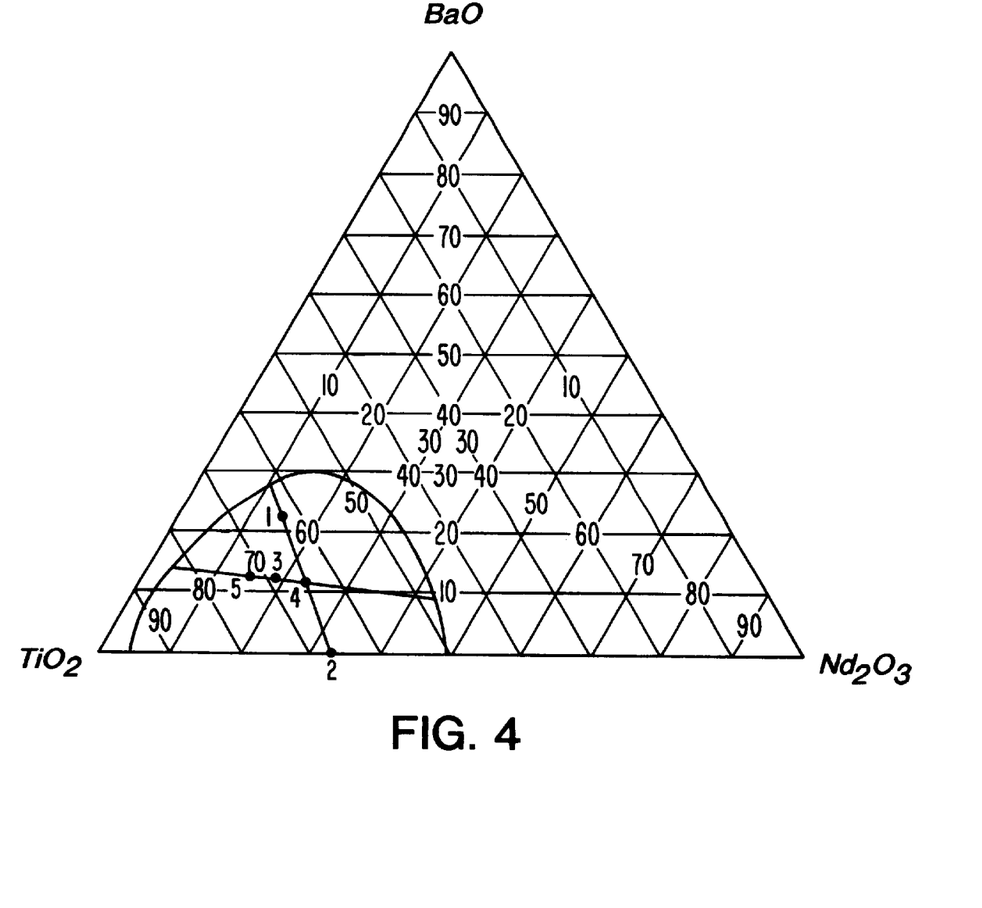
FIG. 4 is a ternary diagram showing the operable molar values of $BaO.TiO_2$ with partial substitution by $Nd_2O_3$, as depicted within the semi-circled area.
Figure 5:
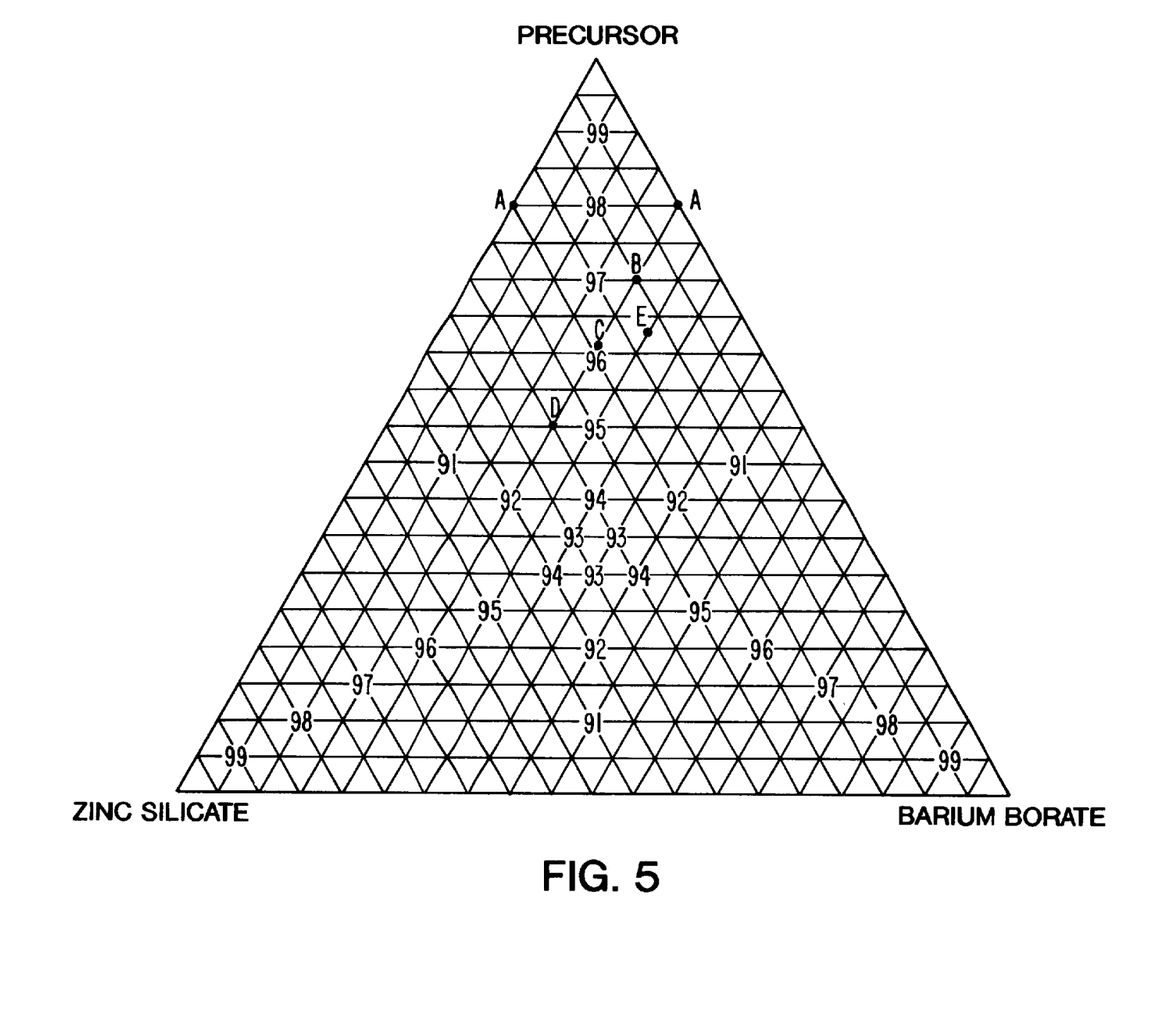
FIG. 5 is a ternary diagram showing the operable weight percentages of a dielectric ceramic powder of dielectric ceramic composition, barium borate and zinc silicate.

Successive coatings of the milled slurry were applied over a glass substrate, with drying of each layer in turn and screen printing an electroding paste of 70% silver and 30% palladium to the cast dried layer. Before applying the next successive dielectric layer, the underlying screen pattern of electroding paste was dried. The body 20, as shown in FIG. 3, with buried electrodes 21 and 22, was cut from the stack and was fired to maturity in a closed crucible at 1,130° C. for 2½. hours. A silver paste was then applied to either end of body 20 at which edges of the buried electrodes were exposed. The body 20 was then fired at 750° C. for a few minutes to form silver terminations 23 and 24. Each sample capacitor had dimensions of 3.0 mm×2.5 mm×0.75 mm and 10 layers of 35 $\mu$ thickness each.

In summary, the fired capacitors yielded a density of 5.436 g/cm$^3$, a K of 465 and a % DF of 0.01 (meeting the EIA-198 standard). The TCC was N2200±150 PPM/° C. (N2350 between −55° C. and +25° C., and N2280 between +25° C. and +125° C.). The insulation resistance was, at 100V and +25° C., greater than 10$^{11}$ Ohms and, at 100V and +125° C., greater than 10$^{10}$ Ohms. The dielectric breakdown was greater than 50V/$\mu$.

B. (Nd$_2$O$_3$.BaO.TiO$_2$) Examples:

This set of examples demonstrates barium titanate with substitution by neodymium oxide, to produce a dielectric ceramic composition of xBaO.yTiO$_2$.zNd$_2$O$_3$, with the objective to attain an NPO dielectric exhibiting a very high Q and density, and a K in the 65 range. Rare earth metal titanates exhibit NPO linear properties, though with relatively high dielectric constants.

The BaO.TiO$_2$.Nd$_2$O$_3$ dielectric ceramic composition was prepared from powders of titanium dioxide, barium carbonate, and neodymium hydroxides, hydrates, oxalates, carbonates or oxides. The powders were mixed in the proportions to derive mole percentage values of 15.4 m % of BaO, 67.6 m % of TiO$_2$, and 17.0 m % of Nd$_2$O$_3$. The mixture was wet ball milled for several hours to produce a slurry. The slurry was dried at around 150° C. and granulated. This powder was then calcined at about 1,250° C. and milled or pulverized to achieve an average particle size of less than 2 microns. Barium borate powder and zinc silicate powder were then added in different weight percentages, as shown in the examples.

Monolayered sample discs were prepared from 50 gm batches. The batches were a mixture of the dielectric ceramic composition and the sintering flux. There batches were combined with certain additives, as shown in the examples, with a small amount of an organic binder, solvent and dispersant, milled for about 15 hours and dried. This process produced homogeneous mixtures, which were granulated and compressed into discs at about 15,000 PSI, and subsequently fired at 1,100° C. The fired dimensions were about 1 cm in diameter and about 0.8 mm in thickness.

The BaO.TiO$_2$.Nd$_2$O$_3$ dielectric ceramic composition was evaluated with two barium borate phases, BaO.B$_2$O$_3$ and 3BaO.B$_2$O$_3$, and varying w % of flux and components thereof. The plotted density results can be grouped in the following manner: (a) zinc silicate constant at 2.5 w % while varying the barium borate, (b) barium borate constant at 2.5 w % while varying the zinc silicate, and (c) zinc silicate constant at 1 w % while varying the barium borate.

Figure 7A:
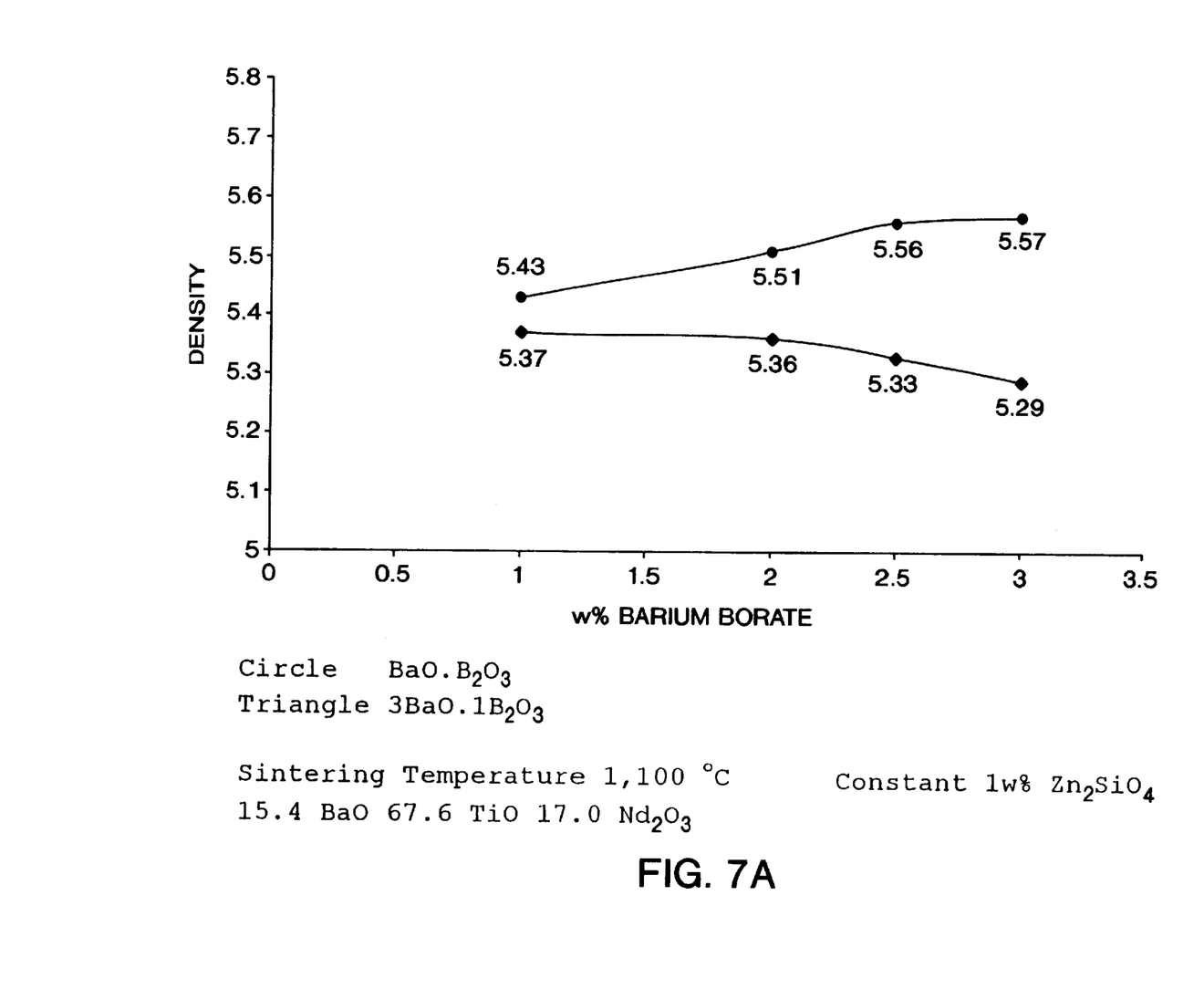
FIG. 7A, FIG. 7B and FIG. 7C are plots of $B_2O_3$ and $SiO_2$, to demonstrate the effective weight percent ranges of $B_2O_3$ and $SiO_2$.

Referring to Table 5, for zinc silicate of a constant 1 w %, samples 46–49 show the change in density relative to varying 3BaO.1B$_2$O$_3$ w %, whereas samples 63–66 show the change in density relative to varying BaO.B$_2$O$_3$ w %. As shown by FIG. 7A for samples 63–66, the density increased as the amount of barium borate was increased. In light of the lesser contribution to the weight percent of B$_2$O$_3$ by the 3BaO.1B$_2$O$_3$ phase, a greater amount of the 3BaO.1B$_2$O$_3$ phase is needed for a more significant effect on the density. Generally, for samples 46–49, the change in density was not necessarily significant in light of the small amount of zinc silicate used. For comparison, consider samples 59–62 and FIG. 7C.

Figure 7B:
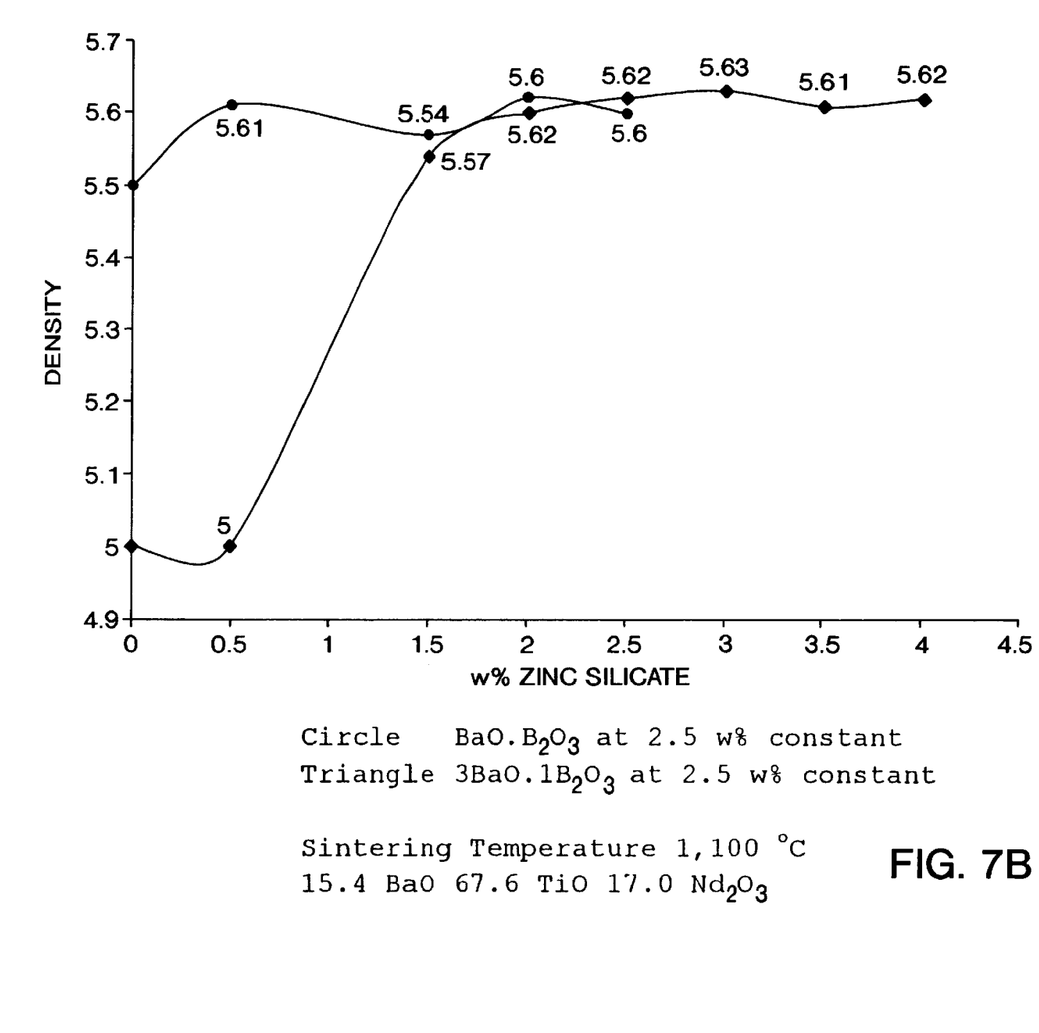

Referring to FIG. 7B, for constant barium borate at 2.5 w %, the lower limit of the w % of zinc silicate is shown by the plot of samples 50–58 and 67–70. With 3BaO.1B$_2$O$_3$, less than 0.1 w % of zinc silicate results in open porosity. Increasing the zinc silicate w % results in the increase of density. The increase in density is also demonstrated by the BaO.B$_2$O$_3$ phase.

While this phase at 0 w % zinc silicate (sample 67) exhibited a relatively good density, this effect is due to the large amount of B$_2$O$_3$ contributed. For samples 71–73, when the zinc silicate was increased to 3 w %, lesser w % of barium borate could be used without effect on the density.

Figure 7C:
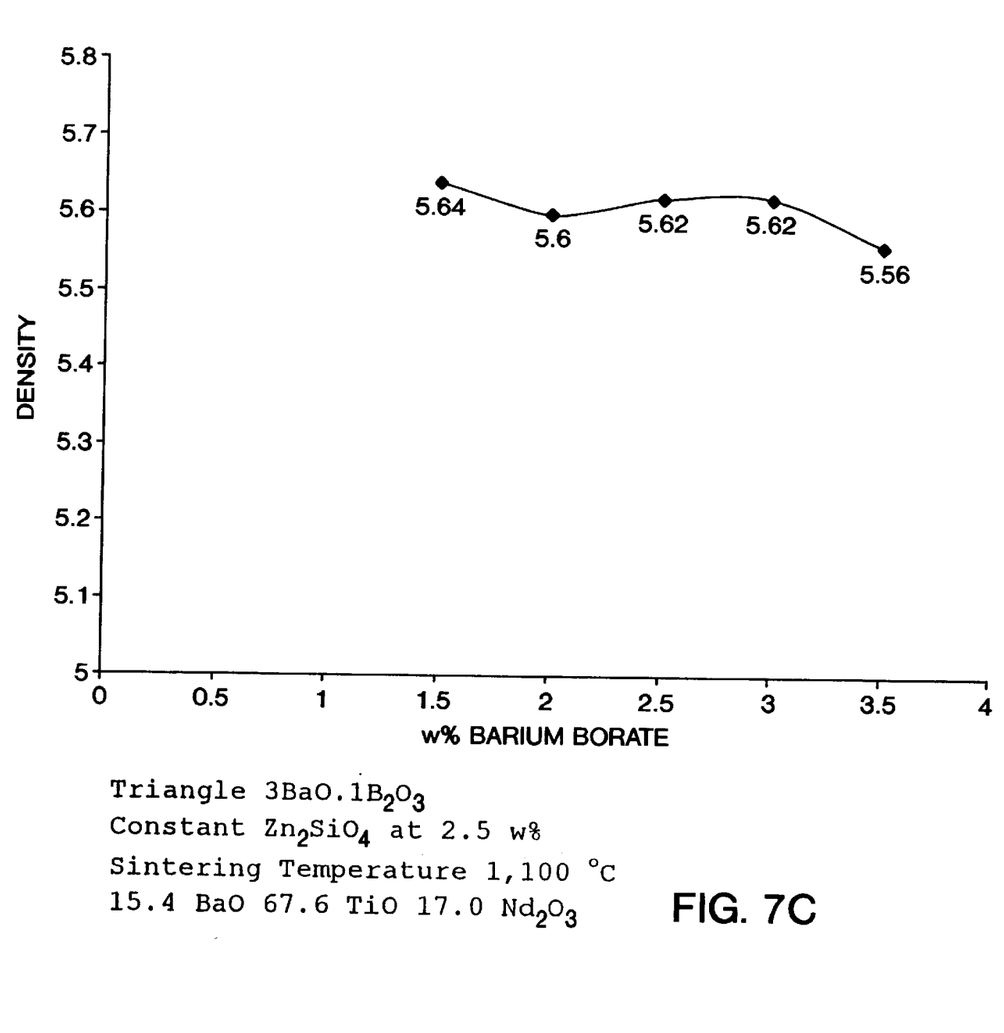

Referring to FIG. 7C, for constant zinc silicate at 2.5 w %, the effect of barium borate is clearly shown via the plot of samples 59–62. For these samples, using the 3BaO.B$_2$O$_3$ phase, the density was significantly higher than samples 46–49, with only 1 w % zinc silicate (as plotted in FIG. 7A).

On review of the sample results of Table 5, the Q factors, overall, were very large, at least 10,000. For the sintering flux composition of 2 w % zinc silicate and 2.5 w % BaO.B$_2$O$_3$, as shown by sample 70, an NPO (COG) dielectric was achieved with a Q exceeding 10,000 and a high density of 5.60 g/cm³. And, as shown sample 54, with 2.5 w % zinc silicate and 2.5 w % 3BaO.1B₂O₃, the NPO (COG) dielectric had a Q exceeding 10,000 and a density of 5.62 g/cm³. The TCC slopes, in general, fell within the EIA-98 standard of ±30 PPM/° C.—depending on the barium borate/ zinc silicate weight percentages. However, it is understood that Table 5's samples were prepared only with 15.4 m % BaO, 67.6 m % TiO₂, and 17.0 m % Nd₂O₃, without adjustment by varying the mole percentages of the oxides. With adjustment of the mole percentages, it may have been possible to achieve more precise NPO (COG) characteristics and properties.

Table 6 shows the results when the additive barium zirconate was added to the 15.4BaO.67.6TiO₂.17.0RE₂O₃ composition used. Using the sintering flux composition of 2.5 w % zinc silicate and 2.5 w % 3BaO.1B₂O₃ (see sample 54 of Table 5), increasing amounts of barium zirconate resulted in a decreased density and Q factor. Characteristic of barium zirconate is the positive effect on the TCC slope. Sample 75 exhibited more linear properties and a K of 62, within the COG standard.

Referring to Table 7, adding bismuth titanate flattened the TCC slope, within the NPO (COG) standard. For 2.5 w % zinc silicate and 2.5 w % 3BaO.B₂O₃, without bismuth titanate (see sample 54 of Table 5 and sample 81 of Table 7), the TCC slope was somewhat more negative. With increasing amounts of bismuth titanate, the TCC slope became less negative and more flat. At 1.5 w % bismuth titanate, the TCC was N13 between −55° C. and +25° C., and N14 between +25° C. and +125° C., with a density of 5.65 g/cm³, a Q of 10,000, and a dielectric constant K of 65.

The effectiveness of the zinc silicate and barium borate flux as a glass was also examined. The glass was prepared via the method previously discussed above for the 75/25 barium titanate/calcium zirconate mixture. In summary, a 6.5 w % glass sample with the 15.4BaO.67.6TiO₂.17.0Nd₂O₃ composition was sintered at 1,100° C. and yielded an NPO (COG) dielectric. The Q≈3, 333. A 4.5 w % glass sample had a Q factor that exceeded 10,000. With 3 w % Zn₂SiO₄ and 1.5 w % BaO.B₂O₃ added as separate components, the dielectric exhibited a decreased Q of 2,500.

Figure 2:
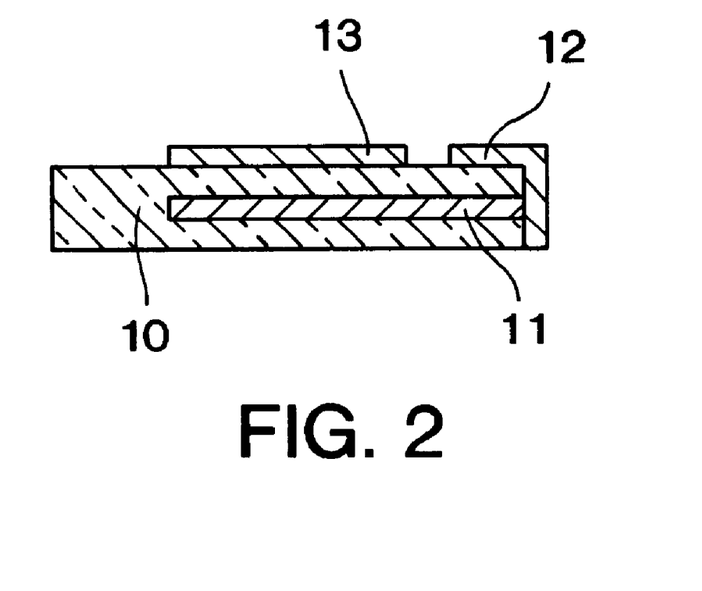

Sample multilayered capacitors were prepared of the precursor composition via that method used to prepare the precursor composition as described above, except that the precursor composition was 95 w % (15.4 m %)BaO.(67.6 m %)TiO₂(17.0 m %)Nd₂O₃ and 5 w % sintering flux (with 3BaO.1B₂O₃ contributing 2.5 weight percent and zinc silicate contributing 2.5 weight percent). The sample multilayered capacitors, as shown in FIG. 2, were then prepared via the process described for the titanate/zirconate capacitors above, with and without bismuth titanate, and the capacitors were fired at 1,100° C. Each sample capacitor had dimensions of 3.0 mm×2.5 mm×0.75 mm and 10 layers of 35µ thickness each.

In summary, for the sample capacitors without bismuth titanate, the fired capacitors yielded a density of 5.55 g/cm³, a K of 68, and Q exceeding 10,000 at 1 KHz and 1,000 at 1 MHz. The TCC was almost within the NPO (COG) standard of ±30 PPM/° C. (N38 between −55° C. and +25° C., and N27 between +25° C. and +125° C.). Capacitance at 1 KHz was 865 pf, and at 1 MHz was 865 pf. In summary, for the sample capacitors with bismuth titanate, the fired capacitors yielded a density of 5.59 g/cm³, a K of 64, and Q exceeding 10,000 at 1 KHz and 1,000 at 1 MHz. The TCC was well within the NPO (COG) standard of +30 PPM/° C. (N26 between −55° C. and +25° C., and N19 between +25° C. and +125° C.). Capacitance at 1 KHz was 1027 pf, and at 1 MHz was 1028 pf.

C. (Magnesium Zinc Calcium Titanate) Examples.

Referring to Tables 9 and 10, the results of a magnesium zinc calcium titanate system (MZCT system) are shown. It was an objective to achieve COG capacitors of high density, high Q, and a K in the 25 range. The MZCT composition used for purposes of example comprised 18.66 w % MgO (31 m %), 18.84 w % ZnO (15.5 m %), 3.5 w % CaO, and 59.6 w % TiO₂ (50 m %). The composition and capacitor samples were prepared via the previously known manner disclosed in Maher, U.S. Pat. No. 4,533,974. As shown through Tables 9 and 10, overall, the dual-component flux of barium borate and zinc silicate was effective when the dielectric ceramic powder was sintered over the range of 1,100 oC and 1,150° C., notwithstanding sample 103 of Table 10. Using only 0.5 w % 3BaO.1B₂O₃ and 1.0 w % Zn₂SiO₄, the capacitors, when fired, yielded very high densities, a K of 23 or 24. Moreover, the TCC's were well within the COG standard. Further, the % DF's were low, especially as shown by samples 100, 101 and 105. These samples exhibited Q factors of at least 10,000. Although sample 99 (prepared with 1.2 w % 3BaO.1B₂O₃ and 1.0 w % Zn₂SiO₄) and sample 103 yielded poor data, it was likely due to measurement difficulties.

In testing the MZCT samples (with the dual-component barium borate and zinc silicate sintering flux), it was discovered that the fired capacitors failed the life expectancy tests. As shown in Table 9, different additives were used to extend the life expectancy, without effect, notwithstanding that some of the additives were well known and have been used to extend life expectancy (BaCO₃, BaZrO₃, MnCO₃, Y₂O₃). As shown via samples 98 through 104 of Table 10 (respective to samples 90 through 95 of Table 9), when fired, these capacitors failed the life expectancy tests.

When a small amount of lithium carbonate (0.3 w %) was tested to determine whether lithium carbonate may effect life expectancy, lithium carbonate's effectiveness was dramatic and unexpected. Those capacitors with Li₂CO₃ passed the life expectancy tests, while still exhibiting excellent electrical and linear properties, as shown by sample 105 of Table 10 (respective to sample 96 of Table 9). Thereafter, Li₂SiO₄ was tested for its effect on life expectancy. As with the Li₂CO₃, those capacitors with Li₂SiO₄ passed the life expectancy test and achieved good electrical and linear properties, as shown by sample 106 of Table 10 (respective to sample 97 of Table 9). The lower Q factor of sample 106 (compared to sample 105) was likely due to the lower sintering temperature of 1,110° C. Samples 105 and 106 were within the COG standard.

D. (Mixtures of Dielectric Ceramic Compositions/Powders).

The calcine of a first powder mixture of (Ba₍₇₅₎ Ca₂₅Ti₇₅Zr₂₅)O₃, 5 w % Bi₂Ti₂O₇, and 3 w % flux (2 w % Zn₂ w % Zn₂SiO₄, 1 w % BaO.B₂O₃) and the calcine of a second powder mixture of 15.4BaO.67.6TiO₂.17.0Nd₂O₃ and 5 w % flux (2.5 w % Zn₂SiO₄, 2.5 w % 3BaO.1B₂O₃)

(no additive was used for this second powder mixture) were mixed together in several different proportions, sintered at 1,130° C. and evaluated, as shown in Table 8.

The particular dielectric ceramic compositions were prepared as previously discussed above. As shown in Table 8, 5 different weight percentages of each dielectric ceramic powder were added together and then sintered 1,130° C. The N2200 and K65 mixtures, when sintered at 1,130° C., yielded dielectrics of high densities and high Q factors. When graphed, as shown in FIG. 6, the resulting curve can provide the specific weight percentages of N2200 and K65 needed to attain dielectrics of specific K and/or TCC values.

This aspect of the present invention is appropriate for an embodiment of a kit comprising a first powder mixture of a $(Ba_mCa_{1-m}Ti_mZr_{1-m})O_3$, additive, and flux (derived to exhibit particular TCC and K properties) and a second powder mixture of $xBaO.yTiO_2.zNd_2O_3$, additive, and flux (derived to exhibit particular TCC and K properties). For each first and second powder mixture, each component of the each powder mixture can be adjusted to yield specific linear and electric properties. Consequently, when the first and second powder mixtures are mixed together in varying proportions, different linear and electrical properties can be achieved, where a curve, similar to that of FIG. 6, can be plotted to show the weight percentages of each powder mixture relative to the particular linear and electric properties desired.

It is understood to those skilled in the art that methods for preparing the dielectric ceramic compositions, discs or capacitors, other than those disclosed herein, can be employed, and the methods disclosed herein are not limitations or restrictions of the present invention.

It is further understood by those skilled in the art that the formula expression of $(Ba_{(1-m)}Ca_mTi_{(1-m)}Zr_m)O_3$ includes not only the compound but also the hydroxides, hydrates, oxides, oxalates, carbonates, or salts precursors, and those compounds selected from the group consisting essentially of $BaCO_3$, $CaCO_3$, $TiO_2$, and $ZrO_2$.

It is further understood by those skilled in the art that the formula expression of $xBaO.yTiO_2.zRE_2O_3$ includes not only the compound but also those compounds selected from the group consisting essentially of x moles baria, y moles titania, and z moles $RE_2O_3$, in the molar ratio previously disclosed.

While the preferred embodiments of the invention have been disclosed and described, further modifications of the invention herein disclosed will occur to those skilled in the respective art and all such modifications are deemed to be within the scope of the invention as defined by the appended claims.

TABLE 1

| Sample | 75/25 BCTZ wt % | 70/30 BCTZ wt % | $2ZnO.SiO_3$ wt % | $BaO.B_2O_3$ wt % | Sintering Temp. ° C. | Density g/cm³ | K | % DF | TCC (−55) PPM/° C. | TCC (+125) PPM/° C. |
|---|---|---|---|---|---|---|---|---|---|---|
| 1 98-55C | 100 | | 0 | 0 | 1300 | porous | *** | *** | *** | *** |
| 2 97-124A | 98 | | 2 | 0 | 1250 | 5.55 | 735 | 0.09 | 6200 | −4100 |
| 3 97-124A | 98 | | 2 | 0 | 1130 | porous | *** | *** | *** | *** |
| 4 97-153A | 97 | | 2 | 1 | 1130 | 5.58 | 796 | 0.068 | 7640 | −4633 |
| 5 97-153B | 96 | | 2 | 2 | 1130 | 5.51 | 819 | 0.086 | 8027 | −4810 |
| 6 97-153C | 95 | | 2 | 3 | 1130 | 5.48 | 828 | 0.103 | 6750 | −4950 |
| 7 97-123A | | 98 | 2 | 0 | 1250 | 5.47 | 470 | 0.05 | 4890 | −3370 |
| 8 97-159A | | 97 | 2 | 1 | 1130 | 5.47 | 465 | 0.01 | 5670 | −3550 |
| 9 97-159B | | 96 | 2 | 2 | 1130 | 5.38 | 484 | 0.03 | 5910 | −3690 |
| 10 97-159C | | 95 | 2 | 3 | 1130 | 5.33 | 444 | 0.06 | 6190 | −3770 |

TABLE 2

| | | | | 0.1 $MnCO_3$ | | | | | | | |
|---|---|---|---|---|---|---|---|---|---|---|---|
| Sample | 75/25 BCTZ wt % | $2ZnO.SiO_3$ wt % | $BaO.B_2O_3$ wt % | $3BaO.B_2O_3$ wt % | $Bi_2Ti_2O_7$ | Sintering Temp. ° C. | Density g/cm³ | K | % DF | TCC (−55) PPM/° C. | TCC (+125) PPM/° C. |
| 11 98-71A | 98.4 | 0.5 | 1 | | | 1130 | porous | *** | *** | *** | *** |
| 12 98-71D | 97.9 | 1 | 1 | | | 1130 | porous | *** | *** | *** | *** |
| 13 98-71C | 97.4 | 1.5 | 1 | | | 1130 | porous | *** | *** | *** | *** |
| 14 98-71D | 96.4 | 2.5 | 1 | | | 1130 | 5.22 | 605 | 3.6 | 2900 | −3100 |
| 15 98-71E | 95.9 | 3 | 1 | | | 1130 | 5.53 | 782 | 0.09 | 7500 | −4500 |
| 16 98-72A | 96.9 | 2 | | 1 | | 1130 | porous | *** | *** | *** | *** |
| 17 98-72B | 95.9 | 2 | | 2 | | 1130 | 5.46 | 705 | 0.16 | 5825 | −4170 |
| 18 98-72C | 94.9 | 2 | | 3 | | 1130 | 5.48 | 729 | 0.12 | 6120 | −4290 |
| 19 98-72D | 93.9 | 2 | | 4 | | 1130 | 5.49 | 700 | 0.14 | 5700 | −4190 |
| 20 97-185A | 93 | 2 | 1 | | 5 | 1130 | 5.54 | 410 | 0.02 | 1920 | −2100 |
| 21 97-185B | 92 | 2 | 1 | | 4 | 1130 | 5.53 | 438 | 0.03 | 2100 | −2150 |

TABLE 3

Bi₂Ti₂O₇

| Sample | 70/30 BCTZ wt % | 75/25 BCTZ wt % | 2ZnO.SiO₃ wt % | BaO.B₂O₃ wt % | Bi₂O₃.2TiO₂ wt % | Sintering Temp. °C. | Density g/cm³ | K | % DF | TCC (−55) PPM/°C. | TCC (+125) PPM/°C. |
|---|---|---|---|---|---|---|---|---|---|---|---|
| 22 97-161A | 97 | | 2 | 1 | 5 | 1130 | 5.53 | 225 | 0.01 | 660 | −1340 |
| 23 97-161B | 96.5 | | 2.3 | 1.2 | 7.5 | 1130 | 5.62 | 245 | 0.07 | 240 | −1000 |
| 24 97-161C | 96.25 | | 2.5 | 1.25 | 10 | 1130 | 5.67 | 271 | 0.1 | 145 | −850 |
| 25 97-165D | | | 2 | 1 | 97 | 1130 | *** | 122 | 0.14 | −109 | 9 |
| 26 97-170C | | 95 | 2 | 1 | 2 | 1130 | 5.57 | 567 | 0.05 | 4265 | 3316 |
| 27 97-170B | | 94 | 2 | 1 | 3 | 1130 | 5.56 | 496 | 0.06 | 3370 | −2724 |
| 28 97-170A | | 93 | 2 | 1 | 4 | 1130 | 5.67 | 464 | 0.05 | 2089 | −2075 |
| 29 97-165A | | 92 | 2 | 1 | 5 | 1130 | 5.57 | 450 | 0.01 | 2290 | −2180 |
| 30 97-165B | | 89.5 | 2 | 1 | 7.5 | 1130 | 5.59 | 310 | 0 | 1392 | −1880 |
| 31 97-165C | | 87 | 2 | 1 | 10 | 1130 | 5.66 | 308 | 0.04 | 165 | −1010 |

TABLE 4

SrTiO₃

| Sample | 70/30 BCTZ wt % | 75/25 BCTZ wt % | 2ZnO.SiO₃ wt % | BaO.B₂O₃ wt % | SrTiO₃ wt % | Sintering Temp. °C. | Density g/cm³ | K | % DF | TCC (−55) PPM/°C. | TCC (+125) PPM/°C. |
|---|---|---|---|---|---|---|---|---|---|---|---|
| 32 97-123B | 78 | | 2 | 0 | 20 | 1250 | 5.38 | 600 | 0.05 | 6200 | −3800 |
| 33 97-123C | 68 | | 2 | 0 | 30 | 1250 | 5.33 | 555 | 0.08 | 5400 | −3425 |
| 34 98-125A | 92 | | 2 | 1 | 5 | 1130 | 5.48 | 838 | 0.19 | 5850 | −4180 |
| 35 98-125B | 89.5 | | 2 | 1 | 7.5 | 1130 | 5.48 | 801 | 0.26 | 4350 | −3750 |
| 36 98-125C | 87 | | 2 | 1 | 10 | 1130 | 5.41 | 745 | 0.32 | 3140 | −3050 |
| 37 98-117 | 77 | | 2 | 1 | 20 | 1130 | 5.32 | 600 | 0.3 | 2760 | −2400 |
| 38 98-121A | 72 | | 2 | 1 | 25 | 1130 | 5.3 | 593 | 0.33 | 4120 | −2550 |
| 39 98-121B | 67 | | 2 | 1 | 30 | 1130 | 5.27 | 611 | 0.29 | 7000 | −3100 |
| 40 97-124B | | 78 | 2 | 0 | 20 | 1130 | 5.27 | 658 | 2.55 | 3775 | −3444 |
| 41 97-124B | | 78 | 2 | 0 | 20 | 1250 | 5.43 | 1015 | 0.14 | 6000 | −4680 |
| 42 97-124C | | 68 | 2 | 0 | 30 | 1250 | 5.37 | 790 | 0.17 | 4780 | −3870 |
| 43 97-128A | | 58 | 2 | 0 | 40 | 1250 | 5.31 | 1177 | 0.44 | 15100 | −5680 |
| 44 97-128B | | 48 | 2 | 0 | 50 | 1250 | 5.19 | 858 | 0.16 | 42600 | −5360 |
| 45 97-128C | | 42 | 2 | 0 | 56 | 1250 | 5.19 | 700 | 0.14 | 37850 | −4860 |

TABLE 5

| Sample | 17.0Nd₂O₃.67.6TiO₂. 15.4BaO wt % | 2ZnO.SiO₃ wt % | BaO.B₂O₃ wt % | 3BaO.1B₂O₃ wt % | Sintering Temp. °C. | Density g/cm³ | K | % DF | TCC (−55) PPM/°C. | TCC (+125) PPM/°C. |
|---|---|---|---|---|---|---|---|---|---|---|
| 46 97-208A | 98.0 | 1.0 | 1.0 | | 1100 | 5.37 | 57 | 0.03 | 27 | 14 |
| 47 97-208B | 97.0 | 1.0 | 2.0 | | 1100 | 5.36 | 62 | 0.02 | 20 | −20 |
| 48 97-244A | 96.5 | 1.0 | 2.5 | | 1100 | 5.33 | 60 | 0.17 | −12 | 3 |
| 49 97-244B | 96.0 | 1.0 | 3.0 | | 1100 | 5.29 | 58 | 0.11 | −2 | −9 |
| 50 97-258A | 97.5 | 0.0 | 2.5 | | 1100 | porous | *** | *** | *** | *** |
| 51 97-258B | 97.0 | 0.5 | 2.5 | | 1100 | porous | *** | *** | *** | *** |
| 52 97-258C | 96.0 | 1.5 | 2.5 | | 1100 | 5.54 | 64 | 0.00 | 39 | −26 |
| 53 97-258B | 95.5 | 2.0 | 2.5 | | 1100 | 5.60 | 65 | 0.00 | 36 | −25 |
| 54 98-30A | 95.0 | 2.5 | 2.5 | | 1100 | 5.62 | 63 | 0.00 | 27 | −20 |
| 55 98-30B | 94.5 | 3.0 | 2.5 | | 1100 | 5.63 | 63 | 0.01 | 20 | −19 |
| 56 98-30C | 94.0 | 3.5 | 2.5 | | 1100 | 5.61 | 61 | 0.01 | 22 | −13 |
| 57 98-30D | 93.5 | 4.0 | 2.5 | | 1100 | 5.62 | 60 | 0.01 | 13 | −10 |
| 58 97-258B | 95.5 | 2.0 | 2.5 | | 1100 | 5.63 | 64 | 0.00 | 41 | −27 |
| 59 98-35A | 96.0 | 2.5 | | 1.5 | 1100 | 5.64 | 62 | 0.00 | 39 | −29 |
| 60 98-35B | 95.5 | 2.5 | | 2.0 | 1100 | 5.60 | 64 | 0.01 | 42 | −26 |
| 61 98-35C | 94.5 | 2.5 | | 3.0 | 1100 | 5.62 | 62 | 0.01 | 3 | −18 |
| 62 98-35D | 94.0 | 2.5 | | 3.5 | 1100 | 5.56 | 61 | 0.01 | 24 | −16 |
| 63 97-208C | 98.25 | 1.0 | 0.75 | | 1100 | 5.43 | 62 | 0.03 | −2 | −18 |
| 64 97-208D | 97.50 | 1.0 | 1.50 | | 1100 | 5.51 | 64 | 0.00 | −7 | −33 |
| 65 97-244C | 97.00 | 1.0 | 2.00 | | 1100 | 5.56 | 65 | 0.00 | 45 | −39 |
| 66 97-244D | 96.50 | 1.0 | 2.50 | | 1100 | 5.57 | 64 | 0.00 | 47 | −32 |
| 67 97-252A | 97.50 | 0.0 | 2.50 | | 1100 | 5.50 | 64 | 0.01 | −91 | −35 |
| 68 97-252B | 97.00 | 0.5 | 2.50 | | 1100 | 5.61 | 64 | 0.00 | −48 | −32 |
| 69 97-252C | 96.00 | 1.5 | 2.50 | | 1100 | 5.62 | 64 | 0.00 | 5 | −34 |
| 70 97-252D | 95.50 | 2.0 | 2.50 | | 1100 | 5.60 | 63 | 0.01 | 25 | −30 |
| 71 98-50A | 95.00 | 3.0 | 2.00 | | 1100 | 5.60 | 60 | 0.00 | 42 | −28 |
| 72 98-50B | 95.50 | 3.0 | 1.50 | | 1100 | 5.59 | 60 | 0.00 | 44 | −19 |
| 73 98-50C | 96.00 | 3.0 | 1.00 | | 1100 | 5.60 | 59 | 0.00 | 33 | −26 |

TABLE 6

BaZrO$_3$

| Sample | 17.0Nd$_2$O$_3$.67.6TiO$_2$.15.4BaO wt % | 2ZnO.SiO$_3$ wt % | 3BaO.1B$_2$O$_3$ wt % | BaZrO$_3$ wt % | Sintering Temp. ° C. | Density g/cm$^3$ | K | % DF | TCC (−55) PPM/° C. | TCC (+125) PPM/° C. |
|---|---|---|---|---|---|---|---|---|---|---|
| 74 98-30A | 95.0 | 2.5 | 2.5 | 0.0 | 1100 | 5.57 | 63 | 0.00 | 22 | −13 |
| 75 98-109A | 94.5 | 2.5 | 2.5 | 0.5 | 1100 | 5.50 | 62 | 0.00 | 19 | −13 |
| 76 98-109B | 94.0 | 2.5 | 2.5 | 1.0 | 1100 | 5.39 | 60 | 0.01 | −19 | −11 |
| 77 98-109C | 93.5 | 2.5 | 2.5 | 1.5 | 1100 | 5.37 | 59 | 0.14 | *** | 0 |
| 78 98-105A | 93.0 | 2.5 | 2.5 | 2.0 | 1100 | 5.39 | 59 | 0.05 | −30 | −11 |
| 79 98-105B | 91.0 | 2.5 | 2.5 | 4.0 | 1100 | 5.21 | 58 | 0.10 | −47 | −52 |
| 80 98-105C | 89.0 | 2.5 | 2.5 | 6.0 | 1100 | 5.22 | 57 | 0.12 | −19 | −72 |

TABLE 7

Bi$_2$Ti$_2$O$_7$

| Sample | 17.0Nd$_2$O$_3$.67.6TiO$_2$.15.4BaO wt % | 2ZnO.SiO$_3$ wt % | 3BaO.1B$_2$O$_3$ wt % | Bi$_2$O$_3$.2TiO$_3$ wt % | Sintering Temp. ° C. | Density g/cm$^3$ | K | % DF | TCC (−55) PPM/° C. | TCC (+125) PPM/° C. |
|---|---|---|---|---|---|---|---|---|---|---|
| 81 98-30A | 95 | 2.5 | 2.5 | 0 | 1,130 | 5.66 | 65 | 0.01 | 49 | −33 |
| 82 98-136A | 94.5 | 2.5 | 2.5 | 0.5 | 1,130 | 5.63 | 64 | 0.01 | 29 | −23 |
| 83 98-136B | 94 | 2.5 | 2.5 | 1 | 1,130 | 5.63 | 65 | 0.01 | 24 | −21 |
| 84 98-136C | 93.5 | 2.5 | 2.5 | 1.5 | 1,130 | 5.65 | 65 | 0.01 | 13 | −14 |

TABLE 8

N2200/K65

| Sample | N2200 wt % | K65 wt % | Sintering Temp. ° C. | density g/cm$^3$ | K | % DF | TCC (−55) PPM/° C. | TCC (+125) PPM/° C. |
|---|---|---|---|---|---|---|---|---|
| 85 98-76A | 100 | 0 | 1130 | 5.55 | 443 | 0.12 | 2280 | −2192 |
| 86 98-76B | 75 | 25 | 1130 | 5.56 | 307 | 0.16 | 1612 | −1850 |
| 87 98-76C | 50 | 50 | 1130 | 5.5 | 176 | 0.06 | 1360 | −1430 |
| 88 98-76D | 25 | 75 | 1130 | 5.42 | 83 | 0.05 | 590 | −500 |
| 89 98-76E | 0 | 100 | 1130 | 5.65 | 65 | 0 | 45 | −29 |

TABLE 9

| Sample | MZCT Lot A wt % | MZCT Lot B wt % | Nb$_2$O$_6$ Temp. ° C. | CaTiO$_3$ g/cm$^3$ | 3BaO.1B$_2$O$_3$ | Zn$_2$SiO$_4$ | BaCO$_3$ PPM/° C. |
|---|---|---|---|---|---|---|---|
| 90 LT-039 | 0 | 97.85 | 0.25 | 0.2 | 0.5 | 1 | 0.2 |
| 91 LT-070 | 91.55 | 0 | 0.25 | 0 | 1.2 | 1 | 0 |
| 92 LT-079 | 95.3 | 0 | 0.25 | 0.2 | 0.5 | 1 | 0.4 |
| 93 LT-100 | 97.75 | 0 | 0.25 | 0.2 | 0.5 | 1 | 0.2 |
| 94 LT-107 | 0 | 92.05 | 0.25 | 0.2 | 0.5 | 1 | 0 |
| 95 LT-155 | 0 | 91.45 | 0.25 | 0.2 | 0.5 | 1 | 0 |
| 96 LT-199 | 0 | 96.26 | 0.25 | 0.2 | 0.5 | 1 | 0 |
| 97 LT-208 | 0 | 96.26 | 0.25 | 0.2 | 0.5 | 1 | 0 |

| Sample | BaZrO$_3$ PPM/° C. | Mg$_2$TiO$_4$ | MnCO$_3$ | BaTiO$_3$ | Y$_2$O$_3$ | Li$_2$CO$_3$ | Li$_2$SiO$_4$ |
|---|---|---|---|---|---|---|---|
| 90 LT-039 | 0 | 0 | 0 | 0 | 0 | 0 | 0 |
| 91 LT-070 | 0 | 3 | 0 | 3 | 0 | 0 | 0 |
| 92 LT-079 | 0 | 0 | 0 | 0 | 0 | 0 | 0 |
| 93 LT-100 | 0 | 0 | 0.1 | 0 | 0 | 0 | 0 |
| 94 LT-107 | 6 | 0 | 0 | 0 | 0 | 0 | 0 |
| 95 LT-155 | 6 | 0 | 0 | 0 | 0.5 | 0 | 0 |
| 96 LT-199 | 1.5 | 0 | 0 | 0 | 0 | 0.3 | 0 |
| 97 LT-208 | 1.5 | 0 | 0 | 0 | 0 | 0 | 0.3 |

MZCT = Magnesium Zinc Calcium Titanate

| oxide | W % | M % |
|---|---|---|
| MgO | 18.66 | 31 |
| ZnO | 18.84 | 15.5 |

TABLE 9-continued

| | | |
|---|---|---|
| CaO | 2.89 | 3.5 |
| $TiO_2$ | 59.6 | 50 |

TABLE 10

All samples had TCC within COG standard +/− 30 PPM/° C.

| Sample | Sintering Temp. ° C. | density g/cm³ | CAP 1 mHz | K | % DF 1 mHz | UDBD volts | IR @ 300 v, 125 C. 0.5 hrs, (ohm) | Life Test 300 v, 125 C., 100 hrs. | Comments |
|---|---|---|---|---|---|---|---|---|---|
| 98 LT-039 | 1100 | 4.17 | 355 | 24 | 0.03 | 655 | >10⁹ | failed after 1 hr | I.R. degradation |
| 99 LT-070 | 1130 | 4.07 | 265 | 24 | N/A | N/A | N/A | failed after 20 hrs | I.R. degradation |
| 100 LT-079 | 1130 | 4.19 | 428 | 24 | 0.01 | 2100 | >10⁹ | failed after 10 hrs | I.R. degradation |
| 101 LT-100 | 1130 | 4.26 | 420 | 23 | 0.01 | 2340 | >10⁹ | failed after 10 hrs | I.R. degradation |
| 102 LT-107 | 1140 | 4.02 | 432 | 23 | NA | N/A | >10⁹ | failed after 1 hr | I.R. degradation |
| 103 LT-155 | 1130 | porous | N/A | N/A | NA | N/A | N/A | N/A | N/A |
| 104 LT-155 | 1150 | 4.18 | 417 | 23 | 0.09 | 1860 | >10⁹ | failed after 2 hrs | I.R. degradation |
| 105 LT-199 | 1130 | 4.27 | 411 | 23 | 0 | 2110 | >10¹¹ | passed | no degradation in I.R. |
| 106 LT-208 | 1110 | 4.2 | 407 | 23 | 0.04 | 1800 | >10¹¹ | passed | no degradation in I.R. |

What is claimed is:

1. A dielectric ceramic powder comprising:
   a) a first powder mixture consisting essentially of
      a1) from 51 to 99 weight percent $(Ba_{(1-m)}Ca_mTi_{(1-m)}Zr_m)O_3$, the molar fraction m ranging from 0.20 to 0.35, respectively by weight of said first powder mixture,
      a2) a first additive selected from the group consisting, respectively by weight of said first powder mixture, of the group of up to 30 weight percent strontium titanate, up to 10 weight percent bismuth titanate, and mixtures thereof,
      a3) a dual-component sintering flux consisting essentially of barium borate and zinc silicate, the barium borate making up from 0.5 weight percent to 5.0 weight percent and the zinc silicate making up from 0.5 weight percent to 4 weight percent of said first powder mixture; and
   b) a second powder mixture consisting essentially of
      b1) a precursor powder selected from the group consisting, respectively by weight of said second powder mixture, essentially of from 82.5 weight percent to 99 weight percent of a powder of $xBaO.yTiO_2.zNd_2O_3$, x ranging from 0 mole percent to 30 mole percent, y ranging from 45 mole percent to 95 mole percent, and z ranging from 5 mole percent to 50 mole percent,
      b2) a second additive selected from the group consisting, respectively by weight of said second powder mixture, essentially of up to 2.5 weight percent bismuth titanate, up to 6 weight percent barium zirconate, and mixtures thereof,
      b3) said dual-component sintering flux, the barium borate making up from 0.5 weight percent to 5 weight percent and the zinc silicate making up from 0.5 weight percent to 4 weight percent of said second powder mixture,
      wherein said first and said second powder mixtures together amount to at least 99 weight percent of said dielectric ceramic powder and the weight percent of each of said first and said second powder mixtures is from 0 to 100 weight percent, so that by sintering said dielectric ceramic powder, there may be provided a low TCC dielectric ceramic body having selected electrical and linear properties by having chosen the relative amounts of each of said powder mixtures and having chosen the relative amounts of each of the environmentally friendly and TCC stabilizing dual-component fluxes.

2. A dielectric ceramic powder of claim 1, wherein the weight percent of $B_2O_3$ in the barium borate of said dual-component flux in each mixture ranges from 0.029 weight percent to 2.75 weight percent, and the weight percent of $SiO_2$ in the zinc silicate of said dual-component in each mixture ranges from 0.08 weight percent to 1.42 weight percent.

3. A dielectric ceramic powder of claim 1, wherein the barium borate of said dual-component flux in each mixture is selected from the group consisting essentially of $BaO.B_2O_3$, $3BaO.1B_2O_3$, $BaO.2B_2O_3$, $BaO.4B_2O_3$, and mixtures thereof.

4. A dielectric ceramic powder of claim 1, wherein the weight percent of said first powder mixture is 100.

5. A dielectric ceramic powder of claim 1, wherein the weight percent of said second mixture is 100.

6. A dielectric ceramic powder of claim 1,
   wherein said first powder mixture is the calcine of $(Ba_{(1-m)}Ca_mTi_{(1-m)}Zr_m)O_3$ said first additive and said dual-component flux, with a grain size of 2 microns or less average particle size, and
   wherein said second powder mixture is the calcine of $xBaO.yTiO_2.zNd_2O_3$, said second additive and said dual-component flux, with a grain size of 2 microns or less average particle size.

7. A dielectric ceramic powder of claim 6, wherein the dielectric ceramic powder is a calcine of said first powder mixture and said second powder mixture, with a grain size of 2 microns or less average particle size.

8. A dielectric ceramic powder of claim 1,
   wherein said first powder mixture is made up of said dual-component flux and the calcine of $(Ba_{(1-m)}Ca_mTi_{(1-m)}Zr_m)O_3$ and said first additive, and
   wherein said second powder mixture is made up of said dual-component flux and the calcine of $xBaO.yTiO_2.zRE_2O_3$ and said second additive.

9. A capacitor having a ceramic body with at least one electrode buried within said ceramic body, an external conductive terminal by which external contact is made to said at least one electrode, said capacitor being co-fired with said at least one electrode, said capacitor's unfired ceramic body having been composed before sintering of a dielectric ceramic powder comprising:
   a) a first powder mixture consisting essentially of
      a1) from 51 to 99 weight percent $(Ba_{(1-m)}Ca_mTi_{(1-m)}Zr_m)O_3$, the molar fraction m ranging from 0.20 to 0.35, respectively by weight of said first powder mixture,
      a2) a first additive selected from the group consisting, respectively by weight of said first powder mixture, of the group of up to 30 weight percent strontium titanate, up to 10 weight percent bismuth titanate, and mixtures thereof,
      a3) a dual-component sintering flux consisting essentially of barium borate and zinc silicate, the barium borate making up from 0.5 weight percent to 5.0 weight percent and the zinc silicate making up from 0.5 weight percent to 4 weight percent of said first powder mixture; and
   b) a second powder mixture consisting essentially of
      b1) a precursor powder selected from the group consisting, respectively by weight of said second powder mixture, essentially of from 82.5 weight percent to 99 weight percent of a powder of $xBaO \cdot yTiO_2 \cdot zNd_2O_3$, x ranging from 0 mole percent to 30 mole percent, y ranging from 45 mole percent to 95 mole percent, and z ranging from 5 mole percent to 50 mole percent,
      b2) a second additive selected from the group consisting, respectively by weight of said second powder mixture, essentially of up to 2.5 weight percent bismuth titanate, up to 6 weight percent barium zirconate, and mixtures thereof,
      b3) said dual-component sintering flux, the barium borate making up from 0.5 weight percent to 5 weight percent and the zinc silicate making up from 0.5 weight percent to 4 weight percent of said second powder mixture,
      wherein said first and said second powder mixtures together amount to at least 99 weight percent of said dielectric ceramic powder and the weight percent of each of said first and said second powder mixtures is from 0 to 100 weight percent,
      so that by sintering said dielectric ceramic powder, there may be provided a low TCC dielectric ceramic body having selected electrical and linear properties by having chosen the relative amounts of each of said powder mixtures and having chosen the relative amounts of each of the environmentally friendly and TCC stabilizing dual-component fluxes.

10. A capacitor of claim 9, wherein the weight percent of $B_2O_3$ in the barium borate of said dual-component flux in each mixture ranges from 0.029 weight percent to 2.75 weight percent, and the weight percent of $SiO_2$ in the zinc silicate of said dual-component in each mixture ranges from 0.08 weight percent to 1.42 weight percent.

11. A capacitor of claim 9, wherein the weight percent of said first powder mixture is 100.

12. A capacitor of claim 9, wherein the weight percent of said second powder mixture is 100.

13. A kit comprising
   a) a first powder mixture consisting essentially of:
      a1) from 51 to 99 weight percent $(Ba_{(1-m)}Ca_mTi_{(1-m)}Zr_m)O_3$, the molar fraction m ranging from 0.20 to 0.35, respectively by weight of said first powder mixture,
      a2) a first additive selected from the group consisting, respectively by weight of said first powder mixture, of the group of up to 30 weight percent strontium titanate, up to 10 weight percent bismuth titanate, and mixtures thereof,
      a3) a dual-component sintering flux consisting essentially of barium borate and zinc silicate, the barium borate making up from 0.5 weight percent to 5.0 weight percent and the zinc silicate making up from 0.5 weight percent to 4 weight percent of said first powder mixture; and
   b) a second powder mixture consisting essentially of
      b1) a precursor powder selected from the group consisting, respectively by weight of said second powder mixture, essentially of from 82.5 weight percent to 99 weight percent of a powder of $xBaO \cdot yTiO_2 \cdot zNd_2O_3$, x ranging from 0 mole percent to 30 mole percent, y ranging from 45 mole percent to 95 mole percent, and z ranging from 5 mole percent to 50 mole percent,
      b2) a second additive selected from the group consisting, respectively by weight of said second powder mixture, essentially of up to 2.5 weight percent bismuth titanate, up to 6 weight percent barium zirconate, and mixtures thereof,
      b3) said dual-component sintering flux, the barium borate making up from 0.5 weight percent to 5 weight percent and the zinc silicate making up from 0.5 weight percent to 4 weight percent of said second powder mixture.

14. A kit of claim 13, wherein the weight percent of $B_2O_3$ in the barium borate of said dual-component flux in each powder ranges from 0.029 weight percent to 2.75 weight percent, and the weight percent of $SiO_2$ in the zinc silicate of said dual-component in each powder ranges from 0.08 weight percent to 1.42 weight percent.

15. A kit of claim 13,
   wherein said first powder mixture is the calcine of $(Ba_{(1-m)}Ca_mTi_{(1-m)}Zr_m)O_3$, said first additive and said dual-component flux, with a grain size of 2 microns or less average particle size, and
   wherein said second powder mixture is the calcine of $yTiO_2 \cdot zNd_2O_3$, said second additive and said dual-component flux, with a grain size of 2 microns or less average particle size.

16. A kit of claim 15, wherein the dielectric ceramic powder is a calcine of said first powder mixture and said second powder mixture, with a grain size of 2 microns or less average particle size.

17. A kit of claim 13,
   wherein said first powder mixture is made up of said dual-component flux and the calcine of $(Ba_{(1-m)}Ca_mTi_{(1-m)}Zr_m)O_3$ and said first additive, and
   wherein said second powder mixture is made up of said dual-component flux and the calcine of $yTiO_2 \cdot zNd_2O_8$ and said second additive.

18. A kit of claim 13, wherein the sintering flux of each mixture is a borosilicate glass.

* * * * *